US006097870A

United States Patent [19]

Ranka et al.

[11] Patent Number: 6,097,870

[45] Date of Patent: Aug. 1, 2000

[54] ARTICLE UTILIZING OPTICAL WAVEGUIDES WITH ANOMALOUS DISPERSION AT VIS-NIR WAVELENGHTS

[75] Inventors: Jinendra Kumar Ranka, Murray Hill; Robert Scott Windeler, Clinton, both of N.J.

[73] Assignee: Lucent Technologies Inc., Murray Hill, N.J.

[21] Appl. No.: 09/313,006

[22] Filed: May 17, 1999

[51] Int. Cl.[7] .......... G02B 6/22

[52] U.S. Cl. .......... 385/127; 385/125; 385/122

[58] Field of Search .......... 385/123, 127, 385/122, 125, 24; 359/154, 173

[56] References Cited

U.S. PATENT DOCUMENTS

| | | | |
|---|---|---|---|
| 5,802,236 | 9/1998 | DiGiovanni et al. | 385/127 |
| 5,960,146 | 9/1999 | Okuno et al. | 385/122 |

OTHER PUBLICATIONS

Fujii et al., *Sum–frequency . . . ,* Optics Lett., vol. 5, No. 2, pp. 48–50 (Feb. 1980).

Mollenauer et al., *Experimental Observation . . . ,* Phys. Rev. Lett., vol.45, No. 13, pp. 1095–1098 (Sep. 1980).

Lin et al., *Large–Stokes–shift . . . ,* Appl. phys. Lett., vol. 38, No. 7, pp. 479–481 (Apr. 1981).

Nakazawa et al., *Efficient multiple visible . . . ,* Appl. Phys. Lett., vol. 45, No. 8 pp. 823–825 (Oct. 1984).

Knox et al., *Optical pulse compression . . . ,* Appl. Phys. Lett., vol. 46, No. 12, pp. 1120–1121 (Jun. 1985).

Rothenberg et al., *Observation . . . ,* Phys. Rev. Lett., vol. 62, No. 5, pp. 531–534 (Jan. 1989).

Sucha et al., *Kilohertz–rate . . . ,* Optics Lett., vol. 16, No. 15, pp. 1177–1179 (Aug. 1991).

Vermelho et al., *Efficient frequency upconversion . . . ,* Optics Lett., vol. 18, No. 18, pp. 1496–1498 (Sep. 1993).

Pshenichnikov et al., *Generation of 13–fs . . . ,* Optics Lett., vol. 18 No. 8, pp. 572–574 (Apr. 1994).

Kazansky et al., *High second–order . . . ,* Optics Lett., vol. 19, No. 10, pp. 701–703 (May 1994).

Kazansky et al., *Blue–light generation . . . ,* Optics Lett., vol. 20, No. 8, pp. 843–845 (Apr. 1995).

Birks et al., *Full 2–D photonic bandgaps . . . ,* Electr. Lett., vol. 31, No. 22, pp. 1941–1943 (Oct. 1995).

Knight et al., *All–silica single–mode . . . ,* Optics Lett., vol. 21, No. 19, pp. 1547–1549 (Oct. 1996).

(List continued on next page.)

*Primary Examiner*—Hung N. Ngo
*Attorney, Agent, or Firm*—Michael J. Urbano

[57] ABSTRACT

Properly designed optical waveguides exhibit anomalous (positive) dispersion over a continuum of visible and near infrared wavelengths and, in one embodiment, the fiber has zero-dispersion at a visible wavelength (e.g., about 760 nm). Preferably, the zero-dispersion point occurs at a vis-nir wavelength where the normal (negative) material dispersion is relatively high and the effective refractive index difference between the core and the cladding is sufficiently large that the anomalous (positive) waveguide dispersion compensates the normal material dispersion. Illustratively, the optical waveguide is a microstructured fiber comprising a solid silica core surrounded by an inner cladding that includes a plurality of capillary air holes that allow for index-guiding within the core. The pattern formed by the cross-sections of the air holes, typically circles, may take on a variety geometric configurations, such as a closely packed hexagon or triangle. Alternatively, the cross-section of the air holes may form two mating, essentially semicircular regions on either side of a core that is supported by a pair of radial webs. As a result of the novel dispersion characteristics of the microstructured fibers combined with small effective area cores, we have demonstrated several applications of the invention that, in the prior art of standard single-mode fibers, have been possible only at wavelengths greater than about 1300 nm, including pulse compression, bright soliton propagation, fundamental mode-to-fundamental mode second harmonic generation, and broadband continuum generation in the visible.

55 Claims, 6 Drawing Sheets

10
12
14.1
14
14.1
16

OTHER PUBLICATIONS

Knight et al., *All–silica single–mode . . . errata,* Optics Lett., vol. 22, No. 7, pp. 484–485 (Apr. 1997).

Mogilevtsev et al., *Group–velocity dispersion . . . ,* Optics Lett., vol. 23, No. 21, pp. 1662–1664 (Nov. 1998).

Abramov et al., *Widely tunable . . . ,* Electr. Lett., vol. 35, No. 1, pp. 1–2 (Jan. 1999).

Monro et al., *Efficient modeling of holey fibers,* Technical Digest, OFC'99, pp. 111–113 (Feb. 1999).

Windeler et al., *Silica–Air Microstructured Fibers . . . ,*Technical Digest, OFC'99, pp. 106–107 (Feb. 1999).

Laser Focus World, pp. 20–21 (Feb. 1999).

Pruneri et al., Optics Lett., vol. 24, No. 4, pp. 208–210 (Feb. 1999).

DiGiovanni et al., *Article Comprising an Air–Clad . . . ,* Application Serial No. 09/042,240, filed March 13, 1998.

ARTICLE UTILIZING OPTICAL WAVEGUIDES WITH ANOMALOUS DISPERSION AT VIS-NIR WAVELENGHTS

FIELD OF THE INVENTION

This invention relates generally to optical waveguides and, more particularly, to articles (i.e., devices, apparatus and systems) that utilize such waveguides.

BACKGROUND OF THE INVENTION

U.S. Pat. No. 5,802,236 issued on Sep. 1, 1998 to D. J. DiGiovanni et al. (hereinafter DiGiovanni) describes non-periodic, microstructured optical fibers that guide radiation by index guiding. This patent is incorporated herein by reference. By appropriate choice of core region and cladding region, DiGiovanni discloses that the effective refractive index difference Δ between core region and cladding can be made large, typically greater than 5% or even 10% or 20%. Such high Δ allows for small mode field diameter of the fundamental guided mode (typically <2.5 μm), and consequently high radiation intensity in the core region. Illustratively, the fiber has a solid silica core region that is surrounded by an inner cladding region and an outer cladding region. In one embodiment, the cladding regions have capillary voids extending in the axial fiber direction, with the voids in the outer cladding region having a larger diameter than those in the inner cladding region, such that the effective refractive index of the outer cladding region is greater than that of the inner cladding region. DiGiovanni also discloses that non-periodic, microstructured fiber of this type has potentially many uses; e.g., as dispersion compensating fiber (with or without dispersion slope compensation), as amplifying fiber, as a laser, as a saturable absorber, for fiber gratings, and for non-linear elements.

From the standpoint of dispersion compensation, FIG. 6 and the associated description at col. 5, lines 61 et seq. of DiGiovanni disclose a computed group velocity dispersion spectrum of an exemplary microstructured fiber at infrared wavelengths of about 1515–1600 nm. As shown in FIG. 5, the fiber includes a silica core and air capillary cladding features. The negative dispersion spectrum of this fiber (solid curve 61) is compared to the positive dispersion spectrum (dashed curve 62) of a commercially available 5D® transmission fiber. About 1 km of the DiGiovanni fiber essentially perfectly compensates the positive dispersion of 94 km of a conventional single mode transmission fiber over a spectral range of more than 20 nm, about 50 nm.

DiGiovanni, however, does not describe the fiber dispersion of microstructured fibers at shorter wavelengths and, in particular, provides no description of such fibers for operation at the visible and near-infrared wavelengths. On the other hand, standard, single-mode fibers exhibit large normal (i.e., negative) group velocity dispersion in the visible wavelength region, severely limiting nonlinear optical interactions in this part of the electromagnetic spectrum. Yet there is a need in the art for devices and systems that exhibit relatively large nonlinear interactions at visible and near-infrared wavelengths. Hereinafter, the term vis-nir wavelengths will be deemed to include the visible spectrum from violet to red (i.e., from about 300 to 900 nm) as well as the near-infrared spectrum (i.e., from about 900 nm to less than about 1270 nm for silica). The upper bound of the vis-nir range may be different for other materials.

SUMMARY OF THE INVENTION

We have discovered that properly designed optical waveguides can exhibit anomalous (positive) dispersion over a continuum of vis-nir wavelengths and, in one embodiment, we also found that the fiber has zero-dispersion at a visible wavelength (e.g., about 760 nm). In general, these characteristics are achieved by mutually adapting the core area and the refractive index difference between the core and cladding; i.e., the core area is made to be relatively small and the index difference to be relatively high. Preferably, the zero-dispersion point occurs at a vis-nir wavelength where the normal (negative) material dispersion is relatively high and the effective refractive index difference between the core and the cladding is sufficiently large that the anomalous (positive) waveguide dispersion compensates the normal material dispersion.

Illustratively, the optical waveguide is a microstructured fiber that comprises a silica core surrounded by a relatively thin inner cladding including a plurality of capillary air holes that allow for index-guiding within the core. The pattern formed by the cross-sections of the air holes, typically circles, may take on a variety geometric configurations, such as a closely packed hexagon or triangle. Alternatively, the cross-section of the air holes may form two mating, essentially semicircular regions on either side of a core that is supported by a pair of radial webs.

As a result of the novel dispersion characteristics of the our microstructured fibers combined with relatively small effective area cores, we have demonstrated several applications of the invention that, in the prior art of standard silica fibers, have been possible only at wavelengths greater than about 1300 nm, including pulse compression, bright soliton propagation, fundamental mode-to-fundamental mode second harmonic generation, and broadband continuum generation in the vis-nir regime.

BRIEF DESCRIPTION OF THE DRAWING

Our invention, together with its various features and advantages, can be readily understood from the following more detailed description taken in conjunction with the accompanying drawing, in which.

In the interest of clarity and simplicity, FIGS. 1–5 and 8–10 have not been drawn to scale.

DETAILED DESCRIPTION OF THE INVENTION

This description will be divided into three sections: first, we describe the design of microstructured fibers (MSFs) that are suitable for generating anomalous dispersion at vis-nir wavelengths; second, we discuss various applications of such fibers; and lastly we provide examples based on experimental results. Although the following discussion focuses primarily on MSFs, the principles of our invention are expected to be applicable to other waveguide types; e.g., planar waveguides such as those formed by a $LiNbO_3$ core disposed on a lower refractive index substrate that acts as a lower cladding. An upper cladding may be formed by an air-interface with the core or by a relatively low index layer disposed on the core.

In general, optical waveguides in accordance with various aspects of our invention have zero dispersion at a vis-nir wavelength where the normal (negative) material dispersion of the core is relatively large (i.e., <–50 ps/nm-km) and the effective refractive index difference between the core and the cladding is sufficiently large (i.e., >5%) that the anomalous (positive) waveguide dispersion compensates the normal material dispersion. The more negative the material dispersion, the larger the refractive index difference that would be designed into the waveguide. The result is that we obtain anomalous dispersion over a range of vis-nir wavelengths and zero-dispersion within that range. In addition, the effective core area is made to be relatively small (i.e., $<40\ \mu m^2$) in order to enhance nonlinear effects within the waveguide.

Microstructured Fiber Design

Figure 1:
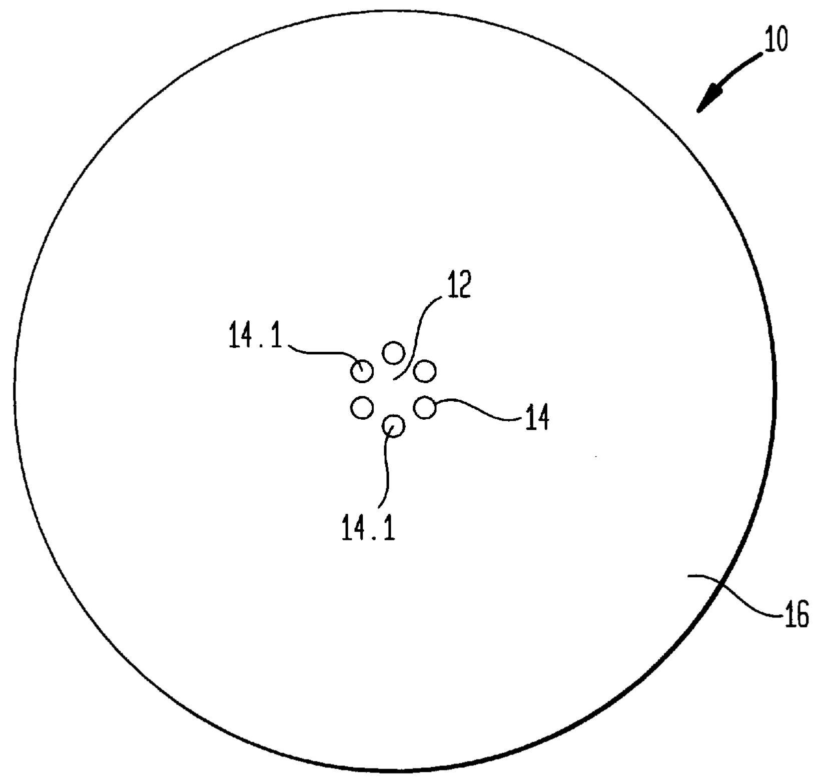
FIG. 1 is a schematic, cross-sectional view of a microstructured optical fiber in accordance with one embodiment of our invention in which a single layer of air holes forms a closely packed hexagon.

With reference now to FIG. 1, we show a schematic cross-section of a MSF 10 in accordance with one embodiment of our invention in which the core 12 is surrounded by an inner cladding 14 and an outer cladding 16. The core may be doped or undoped; solid or liquid; birefringent or non-birefringent. It may take on a variety of shapes; e.g., essentially circular or elliptical. The effective refractive index of the inner cladding 14 is lower than that of the core in order to provide index-guiding of radiation propagating down the longitudinal axis of the fiber. On the other hand, the outer cladding 16 provides strength to the fiber. In accordance with one aspect of our invention, the inner cladding 14 includes a multiplicity of relatively low index cladding features 14.1 that serve to lower the effective refractive index of the inner cladding and to provide index-guiding of radiation propagating in the core. Illustratively, these features constitute capillary air holes that have circular cross sections and are formed in a higher index matrix of, for example, glass. Typically the core and outer cladding are also made of glass, and typically also the glass is silica. The outer cladding, however, need not include features of the type designed into the inner cladding.

Figure 2:
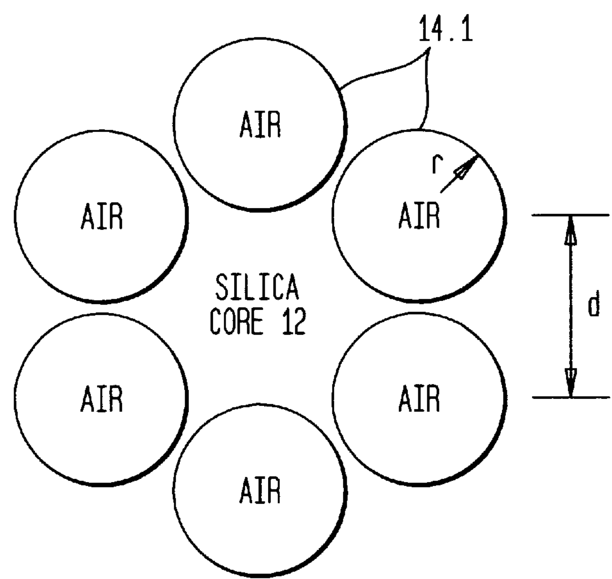
FIG. 2 is an expanded view of the core and air hole regions of the fiber of FIG. 1.

In a preferred embodiment of our invention, at least one relatively thin "layer" of inner cladding features is positioned circumferentially and wrapped around the core to form a closely packed polygon. By thin we mean that the outermost, circumferential boundary of the features is less than about 10–30 μm from the outermost, circumferential boundary of the core. Features beyond about 10–30 μm play no significant role in the index guiding of radiation modes at vis-nir wavelengths. In the case of a single layer of features, the distance between the two boundaries is approximately equal to the size (e.g., diameter) of the features. FIG. 2 illustrates such a single layer design for the case where the features are air holes and the pattern formed by their cross-sections is a hexagon; the core, as well as the interstitial spaces between the air holes, comprise silica. Illustratively, the air holes and the core are essentially circular, the effective core diameter is about 0.5 to 7 μm (e.g., 1.7 μm), the effective core area is about 0.2 to 40 $\mu m^2$, the diameter of the air holes is about 0.5 to 7 μm (e.g., 0.7 μm), and the center-to-center spacing of the air holes is about 0.5 to 7 μm (e.g., 1.6 μm). A common outer diameter of the fiber is about 125 μm although other sizes are suitable. Δ is relatively large, illustratively about >1% to 30%, preferably >5%, where $\Delta=(n_{eff,core}-n_{eff,clad})/n_{effcore}$, expressed as a percent. MSFs of this type can be single mode. However, multimode MSFs are also suitable for some of the applications of our invention.

Figure 3:
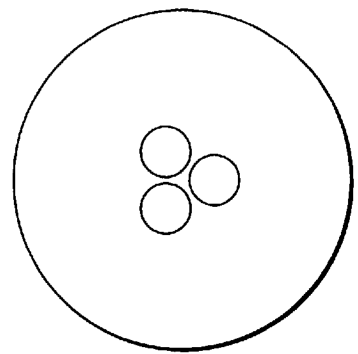
FIG. 3 is a schematic, cross-sectional view of a microstructured optical fiber in accordance with an alternative embodiment of our invention in which a single layer of air holes forms a closely packed triangle.
Figure 4:
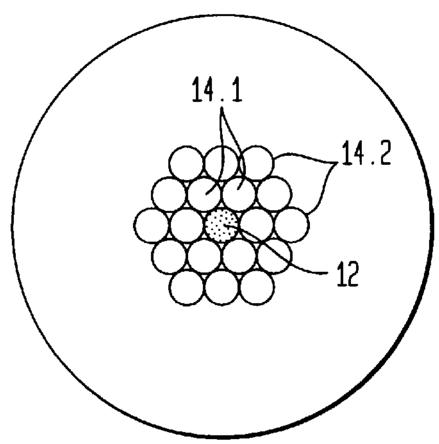
FIG. 4 is a schematic, cross-sectional view of a microstructured optical fiber in accordance with another embodiment of our invention in which two layers of air holes form a closely packed hexagon.
Figure 5:
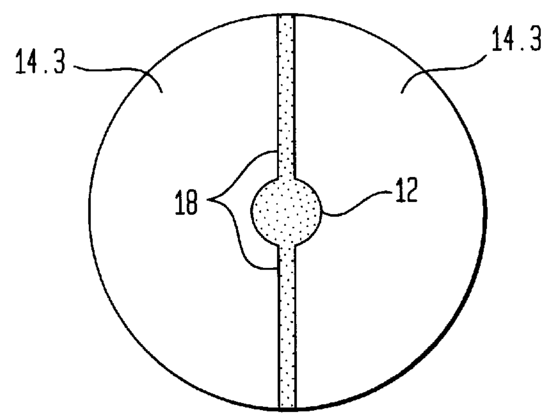
FIG. 5 is a schematic, cross-sectional view of a microstructured optical fiber in accordance with yet another embodiment of our invention in which the air holes form semicircular regions on either side of the core.

Alternative embodiments of MSF designs in accordance with our invention are shown in FIGS. 3–5, where the outer circles in FIGS. 3–4 represent the outer boundary of the outermost cladding, but the outer circle in FIG. 5 represents the outer boundary of the inner cladding. (Compared to FIG. 1 the outer claddings in FIGS. 3 & 4 have been compressed to save space in the drawing.) In FIG. 4, additional air holes are included in the inner cladding; for example, a second "layer" of air holes 14.2 is closely packed around the first layer of air holes 14.1 to form a nested arrangement of holes. As before, the outer boundary of the second layer of air holes should be less than about 10–30 μm from the outer boundary of the core. Likewise, if yet another layer(s) of air holes, or other features, were included, the same condition should be satisfied. On the other hand, in FIGS. 3 & 5 fewer air holes are included in the inner cladding. Thus, FIG. 3 depicts a closely packed arrangement of three air holes. The pattern of their cross-sections forms a triangle. In contrast, FIG. 5 depicts a pair of essentially semicircular air holes 14.3 on either side of the core 12, the latter being supported by a pair of radial ribs 18.

All optical fibers, standard fibers as well as MSFs, exhibit group velocity dispersion (GVD) that can adversely affect the quality of optical signals that propagate along the fiber and the performance of apparatus or systems that incorporate the fiber. GVD has two parts: waveguide dispersion, which is a function of the distribution of the radiation between the core and cladding; and material dispersion, which is inherent in the material from which the fiber core is made and is a well-known function of wavelength. Material dispersion dominates in standard, single-mode silica fibers in the vis-nir regime where waveguide dispersion is relatively low because A is relatively low (e.g., <1%). These fibers typically exhibit zero dispersion at about 1270 nm and anomalous (i.e., positive) GVD at longer wavelengths. While it is known that the zero-dispersion point in these fibers can be shifted to longer wavelengths (e.g., 1310–1550 nm) by increasing $\Delta$ and reducing the core size, in general it has not been known how to create a zero-dispersion point at less than 1270 nm.

In non-standard fibers such as MSFs, where waveguide dispersion plays a much more significant role because $\Delta$ is much larger (e.g., >5%), the situation is very different. For example, although D. Mogilevtsev et al., *Optics Lett.*, Vol. 23, No. 21, pp.1662–1664 (November 1998), predicted that photonic crystal fibers could have zero dispersion at wavelengths shorter than 1270 nm, no one to our knowledge has made such a prediction, nor provided an experimental demonstration, that MSFs could have zero dispersion at such shorter wavelengths. Not even DiGiovanni, supra, addressed this issue for MSFs, their description of dispersion (cf, FIG. 6) focusing on the narrow range of about 1515–1600 nm. And certainly no one predicted the surprising result that we discovered—properly designed MSFs can have anomalous dispersion over a range of vis-nir wavelengths and zero dispersion at a wavelength within the same range. Hereinafter, the anomalous dispersion range will be referred to as the ADR.

In general, we have discovered that the waveguide dispersion in a MSF can be altered so as to compensate for the material dispersion, resulting in small GVD in at least a portion of the vis-nir wavelength range. This characteristic of our MSFs allows phase matching to be achieved more readily and nonlinear frequency conversion to occur more efficiently. More specifically, we have found that silica MSFs can have a zero dispersion wavelength well below 1270 nm, illustratively in the range of 700–910 nm (e.g., 760 nm), and the GVD in the same range can be anomalous (positive). Illustratively, the maximum GVD in this range is about +80 ps/nm-km at about 910 nm. In contrast, a standard step index, single mode fiber would have a negative dispersion of nearly −130 ps/nm-km at 760 nm and about −80 ps/nm-km at 910 nm. For more detail see FIG. 6. In addition, we expect our MSFs can be made to exhibit similar dispersion properties at near infrared wavelengths, illustratively from 910–1270 nm. The zero-dispersion point can be altered by changing the effective diameter of the core, the material and composition of the core, the size and spacing of the air holes, and/or the number of layers of air holes.

In addition, it may be possible for such MSFs to exhibit two zero-dispersion wavelengths within the vis-nir regime, one at each end of the ADR.

These novel dispersion characteristics, combined with the small effective area of the core, lead to novel applications that represent further aspects of our invention. These applications, which include communications systems, broadband vis-nir light generators, pulse compression schemes, nonlinear frequency converters, and fiber lasers are discussed in the next section.

Applications

Figure 8:
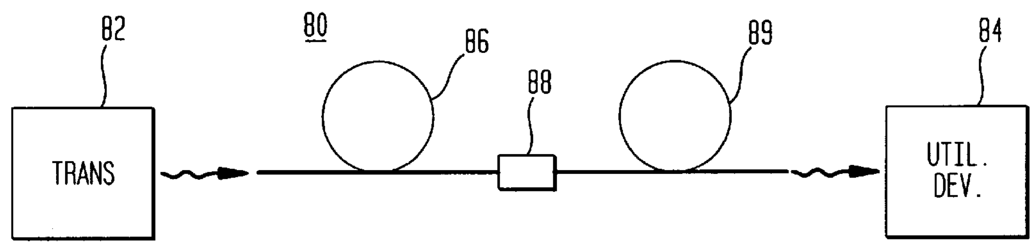
FIG. 8 is a schematic, block diagrammatic view of an optical communication system in accordance with still another embodiment of our invention.

As shown in FIG. 8 a communication system 80 includes a single mode optical fiber that provides a communication link between an optical transmitter 82 and utilization device 84. The utilization device may be a piece of terminal equipment, an optical receiver, a photodetector, an optical amplifier, etc. The link may include one or more optical devices 88 well known in the art such as optical amplifiers, couplers, multiplexers, isolators etc. that couple a first fiber section 86 to a second fiber section 89. In accordance with one embodiment of our invention, at least one of the segments 86 & 89 comprises a MSF having a zero-dispersion point at a vis-nir wavelength $\lambda_o$ as described above, and the transmitter includes an optical source (e.g., a laser) that generates a signal having a wavelength $\lambda_s$ within the ADR.

The system of FIG. 8 may be adapted for pulse compression in several ways. In each case transmitter 82 includes an optical source (e.g., a semiconductor laser) that generates a pulsed optical signal that is coupled into fiber section 86. For soliton-based compression, the source is designed so that $\lambda_s$ is within the ADR but near to $\lambda_o$ (e.g., $\lambda_s$=780 nm and $\lambda_o$=760 nm) and so that the peak pulse power is sufficiently high that the nonlinearities of the MSF segment compensate the anomalous dispersion of the MSF; i.e., soliton propagation occurs. In systems where the source itself generates pulses that are negatively chirped (i.e., shorter wavelength components are delayed relative to longer wavelength components), the anomalous dispersion of the MSF segment compensates for the negative chirp of the pulses, thereby compressing the pulses (as compared to a system where the MSF segment is absent). In other systems the source itself may not necessarily generate negatively chirped pulses; rather some other component in the system, such as a standard fiber section 86 having normal (negative) dispersion, induces a negative chirp in the pulse as it propagates through the component. In addition, at sufficiently high powers it is well known that pulses propagating through such components may also be broadened by self-phase modulation. In such systems, the other fiber section 89 is designed to be a MSF having anomalous (positive) dispersion that compensates the broadening caused by the normal dispersion/self-phase modulation component, thereby compressing the pulses (as compared to a system where the MSF segment is absent).

Figure 9:
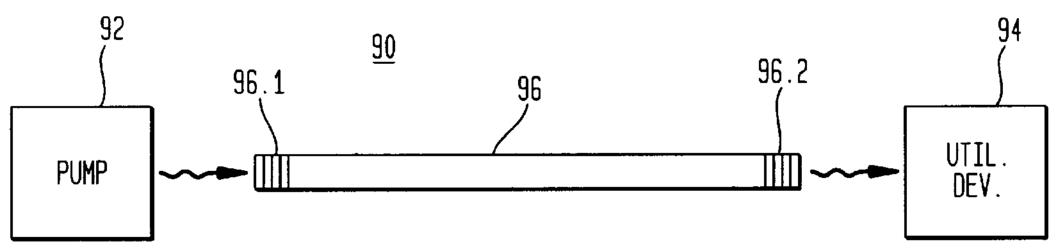
FIG. 9 is a schematic, block diagrammatic view of a fiber light generator (e.g., a laser) in accordance with still one more embodiment of our invention.

On the other hand, ignoring for the moment the gratings 96.1 & 96.2, FIG. 9 depicts a coherent vis-nir light generator 90 that includes an optical pump source 92 coupled to a MSF 96. The output of the fiber, which may be either single mode or multimode, is delivered to a utilization device 94. Depending on the application, the device 94 may be, for example, a photodetector, a display, or an optical storage medium. Typically, the pump source 92 is a laser that generates optical pulses having a peak optical power greater than a few hundred watts, although operation at even lower peak pump powers may be feasible. The wavelength $\lambda_p$ of the pump source output is chosen to be near the zero-dispersion point; i.e., $\lambda_o-\Delta\lambda_1<\lambda_p<\lambda_o+\Delta\lambda_2$, where $\Delta\lambda_1$ and $\Delta\lambda_2$ need not be equal to one another. Illustratively, $\Delta\lambda_2$ and $\Delta\lambda_1$ are selected so that the GVD at the lower bound is negative (e.g., −75 ps/nm-km) and at the upper bound is positive (e.g., +535 ps/nm-km). Illustratively, 690 nm$<\lambda_p<$1270 nm for silica MSFs. Based on a combination of nonlinear effects (i.e., phase-matched four-wave mixing, self phase modulation, Raman scattering and sum-frequency generation) in the MSF, the light generator 90 emits a broad continuum of light over a range of vis-nir wavelengths from blue (e.g., 390 nm) to near-infrared (e.g., 1600 nm) when the pump source generates pulses having only a few kilowatts of peak power, as described more fully in the next section. (In contrast, the prior art has been able to generate visible light outputs only in bulk glass pumped by optical pulses having megawatts of peak power, power levels that would damage a glass fiber. See, for example, G. Sucha et al., *Optics Lett*., Vol. 16, No. 15, pp. 1177–1179 (1991), which is incorporated herein by reference. The generator 90 can be tuned over this wavelength range by changing the pump power and/or the pump wavelength (thereby affecting the degree to which nonlinear mechanisms produce various wavelength components).

Some of the effects that we have observed depend on how lossy the fiber is and how far the pump signal propagates down the fiber. Of course, for most practical communications applications lossy fibers are typically not desirable, yet the presence of such loss in some of our experimental fibers has led to very interesting observations that suggest that such MSFs may find application in the entertainment or toy industries. First, when the fiber is fairly lossy and the pump signal attenuates fairly quickly (e.g., in the first few centimeters), the entire fiber can be made to glow (i.e., emit light visible to the naked eye) at apparently the same color; i.e., at essentially a single wavelength. Alternatively, when the fiber is less lossy and the pump propagates farther along the fiber, a single length (e.g., 50–75 cm) of MSF can apparently be made to simultaneously emit a broad spectrum of wavelengths but at sequentially different longitudinal locations along the length of the fiber. Thus, a viewer sees a spectacular rainbow form along the length of the MSF, with, for example, the fiber glowing red nearest the pump, while the immediately adjacent section along the fiber length glows orange, and the next sections farther along the fiber glow, in order, yellow, green and blue, respectively. Actually, the fiber is emitting multiple colors at all locations, with the spectrum broadening with propagation distance from the pump (e.g., mostly red nearest the pump, but mostly violet farthest from the pump), but sensitivity of the human eye (which is higher in the green) causes the visible radiation escaping from fiber to exhibit a rainbow effect.

Returning now to FIG. 9, the light generator 90 may also function as a laser by designing the MSF to be single mode, by including well known fiber gratings 96.1 & 96.2 that form a linear optical cavity resonator, and by doping the core (e.g., silica) of the MSF (or the core of a section of standard fiber coupled in tandem with the MSF) with a suitable active medium (e.g., a rare earth such as Yb or Nd). Grating 96.1 is designed to be transmissive at the pump wavelength and highly reflective at the lasing wavelength (e.g., 920–1116 nm depending on the active medium), whereas grating 96.2 is designed to be partially transmissive at the lasing wavelength to permit egress of a portion of the lasing radiation from the resonator to utilization device 94. Such a laser may function as either a CW source or as a pulsed (e.g. soliton) source. Alternatively, the resonator may be formed as a well-known ring resonator, rather than as a linear resonator. In this case, input and output fibers would be coupled to two ports of a four-port optical coupler, and a ring or loop of fiber would be coupled to the other two ports. The ring or loop would include a section of MSF fiber, and at least a portion of the ring or loop would be doped with an active medium in accordance with this aspect of our invention.

Figure 10:
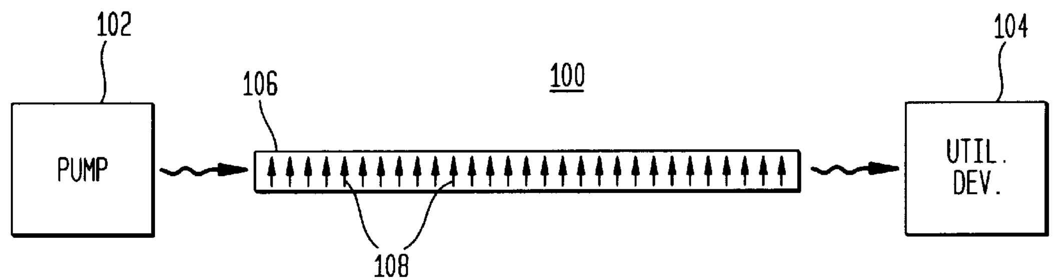
FIG. 10 is a schematic, block diagrammatic view of a poled fiber apparatus for second harmonic generation or sum-frequency generation in accordance with yet another embodiment of our invention.

In both second harmonic generation and sum-frequency generation the output wavelength is less than the pump wavelength. In standard silica optical fibers these processes are known to be inefficient (essentially non-existent) because of the absence of the second order nonlinearity. The prior art has taken various approaches to induce the second order nonlinearity. One approach, known as poling, generally entails applying a transversely-directed electric field to periodic segments along the fiber's longitudinal axis. The field aligns the fiber molecules under the electrodes (i.e., the molecules are poled) along the direction of the field lines and thereby induces the desired second order nonlinearity. Periodic poling is required because the standard fiber's GVD causes the interacting pump and generated (SHG or sum-frequency) waves to slip out of phase with one another. To reduce this effect the poling field is not applied to the fiber in the regions between adjacent, periodic electrodes. For operation at 1550 nm the poled section of the fiber is typically about 1 cm long and includes a multiplicity of tandem electrodes having a period of about 55 μm, each electrode being about 50 μm long. See, for example, V. Pruneri et al., *Optics Lett*., Vol. 24, No. 4, pp. 208–210 (February 1999), which is incorporated herein by reference. In contrast, in accordance with another embodiment of our invention, as shown in FIG. 10, periodic poling is not required in order to compensate for phase slipping between the pump and generated waves. Instead, we take advantage of the fact that the waveguide contribution to dispersion in MSF 106 in the vis-nir regime is relatively large and can provide for phase matched interactions. More specifically, MSF 106, which may be a section of a longer fiber, couples a pump source 102 to a utilization device 104. As indicated by the arrows 108, poling is induced in the MSF 106 by applying a transversely-directed, non-periodic electric field along a predetermined length of the fiber. The poling of the fiber molecules over an extended, essentially continuous length (e.g., on the order of 1 cm) induces the desired second order nonlinearity. Phase matching to the pump is facilitated because the dispersion profile is sufficiently altered (compared to that of bulk silica).

The following examples describe experiments performed on MSFs in accordance with several embodiments of our invention. Various materials, dimensions and operating conditions are provided by way of illustration only and, unless otherwise expressly stated, are not intended to limit the scope of the invention.

EXAMPLE I

In this example, the design of the MSF was similar to that shown in FIG. 4, except that five thin layers of features were contained within the inner cladding and within about 30 μm of the outer boundary of the core region. The inner cladding features 14.1 were essentially circular, capillary air holes (n=1) each having a diameter of about 1.7 μm The core 12 and outer cladding 16 comprised silica (n=1.45). The essentially circular core had a diameter of about 2.25 μm and an effective area of about 4 $\mu m^2$, and the center-to-center spacing of the air holes was about 2.0 μm. The outer cladding diameter was about 125 μm, and the fiber length was about 75 cm. Since the material of the inner cladding is primarily air (n=1) but contains some silica (n=1.45), Δ is less than 31% and is estimated to be greater than about 10–20%.

A Ti-sapphire pump laser, tunable over the range of about 700–1000 nm, was coupled to one end of the fiber. This laser generated 100 fs pulses having an average power up to about 1 W and a peak power up to a few kW.

Figure 6:
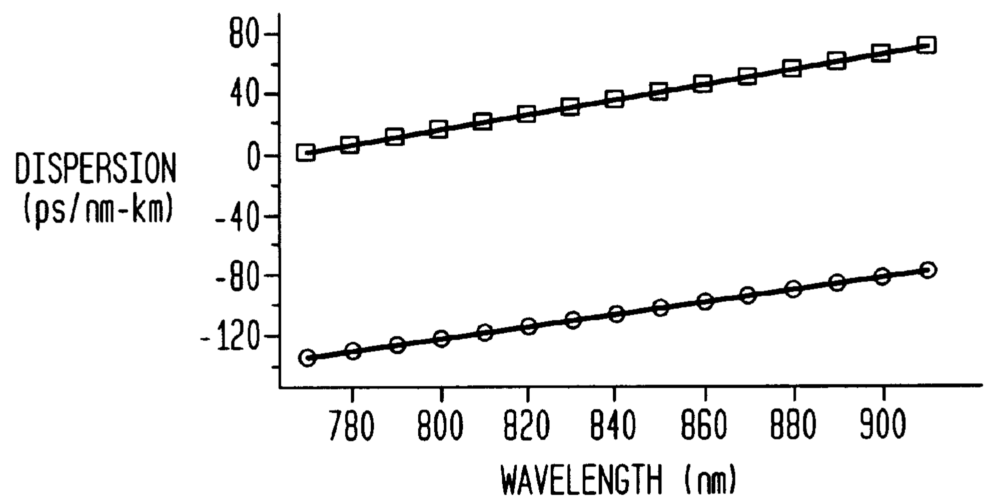
FIG. 6 is a graph of measured group velocity dispersion (GVD) for a single mode microstructured fiber (square data points) compared to that of a standard transmission fiber (circular data points)

The GVD of the MSF was determined by measuring the group delay of a one meter section of fiber in a Michaelson interferometer with an air path reference, as the center wavelength of the pump was tuned from about 770 nm to 910 nm. In FIG. 6 we show the measured GVD of the MSF (square data points) and of a standard, single mode, step-index fiber (circular data points). Whereas the standard fiber exhibited normal (negative) GVD, due primarily to material dispersion similar to that of bulk silica (about −135 to −76 ps/nm-km in the 770–910 nm range), with a zero dispersion wavelength of about 1270 nm, our MSF exhibited anomalous (positive) dispersion over this entire spectral range, with a calculated zero-dispersion wavelength of about 760 nm. The material dispersion of our silica MSFs was similar to that of the standard silica fibers described above.

Figure 7:
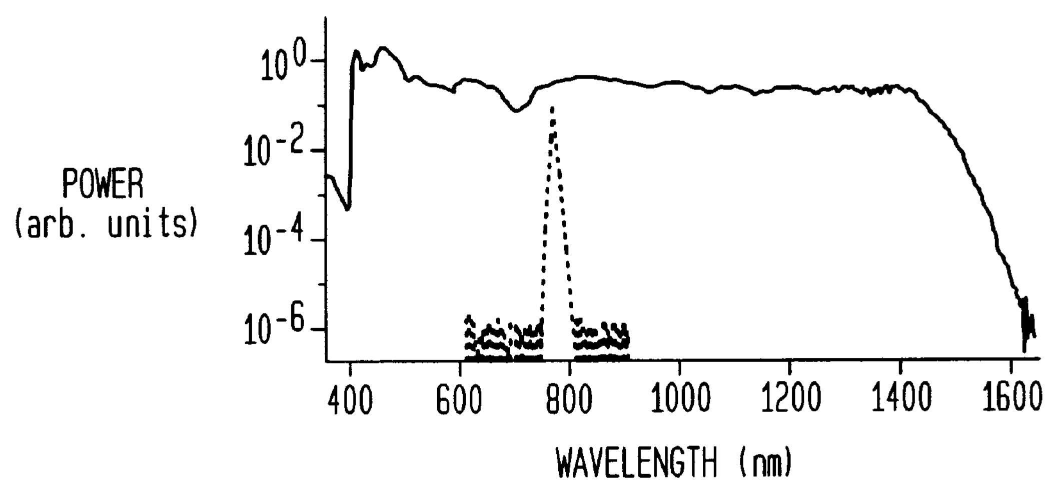
FIG. 7 is a graph showing the optical spectrum (solid line) of the continuum generated in a 75 cm section of microstructured fiber of the type shown in FIGS. 1–2 when pumped by optical pulses having the following characteristics: duration of 100 fs, peak power of 8.0 kW (0.8 nJ of energy), and wavelength of 780 nm. The spectrum of the pump pulse is also shown (dotted line)

As a result of the novel dispersion characteristics of our MSF combined with the small effective area core, we have observed a host of nonlinear effects at about 800 nm that to the best of our knowledge have been possible heretofore only at wavelengths above about 1300 nm. These nonlinear effects include pulse compression, bright soliton propagation, fundamental mode-to-fundamental mode second harmonic generation, and broadband continuum generation. For example, in FIG. 7 we show the spectrum of white light, single mode continuum generated by injecting 100 fs pulses at 780 nm with 8.0 kW peak power into the above-described 75 cm length of MSF. The output of the MSF segment was coupled to a well-known optical spectrum analyzer via a standard fiber pigtail. These data represent a conversion efficiency (pump radiation to visible radiation in the range of about 350–700 nm) of approximately 31%.

EXAMPLE II

In an experiment similar to that describe in Example I, we utilized instead a MSF fiber corresponding to that shown in FIGS. 1–2. In this example, The inner cladding features 14.1 were essentially circular, capillary air holes (n=1) each having a diameter of about 2.9 $\mu$m. The core 12 and outer cladding 16 comprised silica (n=1.45). The core was essentially elliptical (major diameter of about 4.4 $\mu$m and minor diameter of about 3.3 $\mu$m; effective core area about 11 $\mu m^2$). The center-to-center spacing of the air holes was about 6.6 $\mu$m. The outer cladding diameter was about 125 $\mu$m, and the fiber length was about 2 m. Since the material of the inner cladding is primarily air (n=1) but contains some silica (n=1.45), $\Delta$ is less than 31% and is estimated to be greater than about 10–20%. Although we did not measure the dispersion characteristics of this fiber since it tended to be multimode, we did observe the same type of white light continuum. From this we can reasonably infer that the fiber had dispersion characteristics similar to the MSF discussed in Example I.

EXAMPLE III

Figure 11:
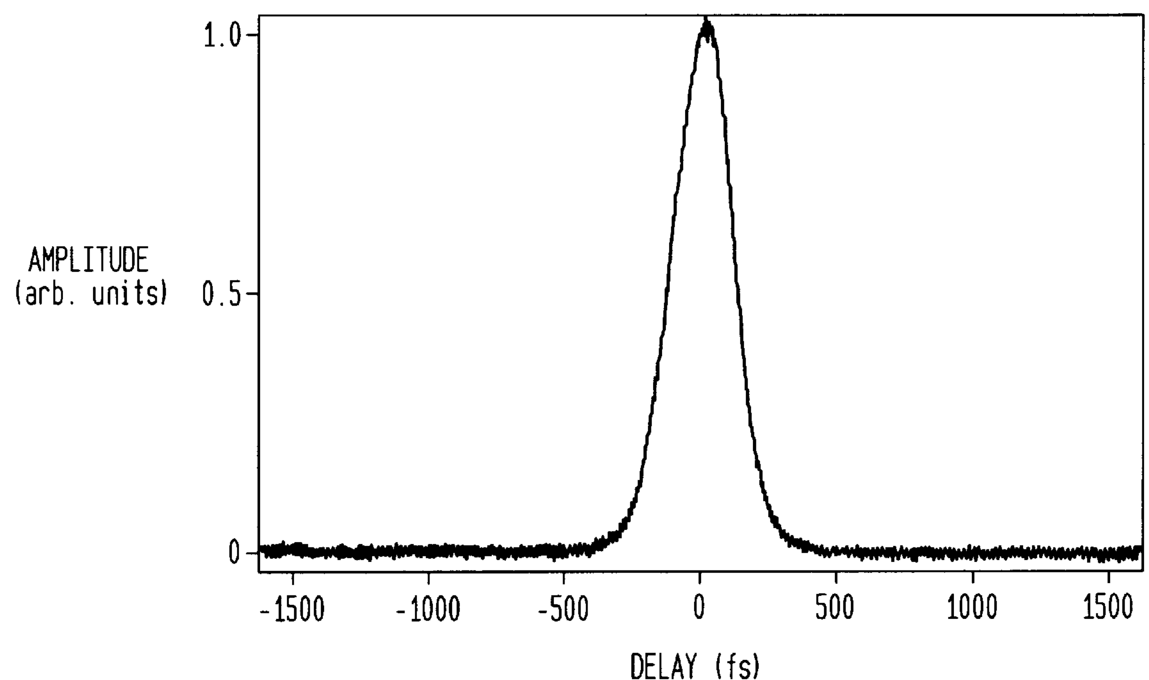
FIG. 11 is an autocorrelation measurement of the output pulse from a microstructured optical fiber in accordance with a pulse compression (soliton propagation) experiment in accordance with one embodiment of our invention.

In this example the experiment was designed to measure the characteristics of pulse propagation in an MSF of the type described in Example I. The fiber was 20 m long and was coupled between a pump laser and a interferometric autocorrelation apparatus of the type described in Example I. The output of the pump laser, as coupled into the fiber, was an optical pulse having a wavelength of 780 nm, duration of 110 fs, and peak power of 79 W. At relatively low pump powers this fiber would exhibit primarily anomalous dispersion and would have generated an output pulse having a duration of about 400 fs. However, at sufficiently high pump power the nonlinearities in the MSF compensated the anomalous dispersion. Consequently, the MSF generated an output pulse of only about 175 fs as shown in FIG. 11. These data suggest that the pulse propagated as a soliton in the fiber.

EXAMPLE IV

Figure 12:
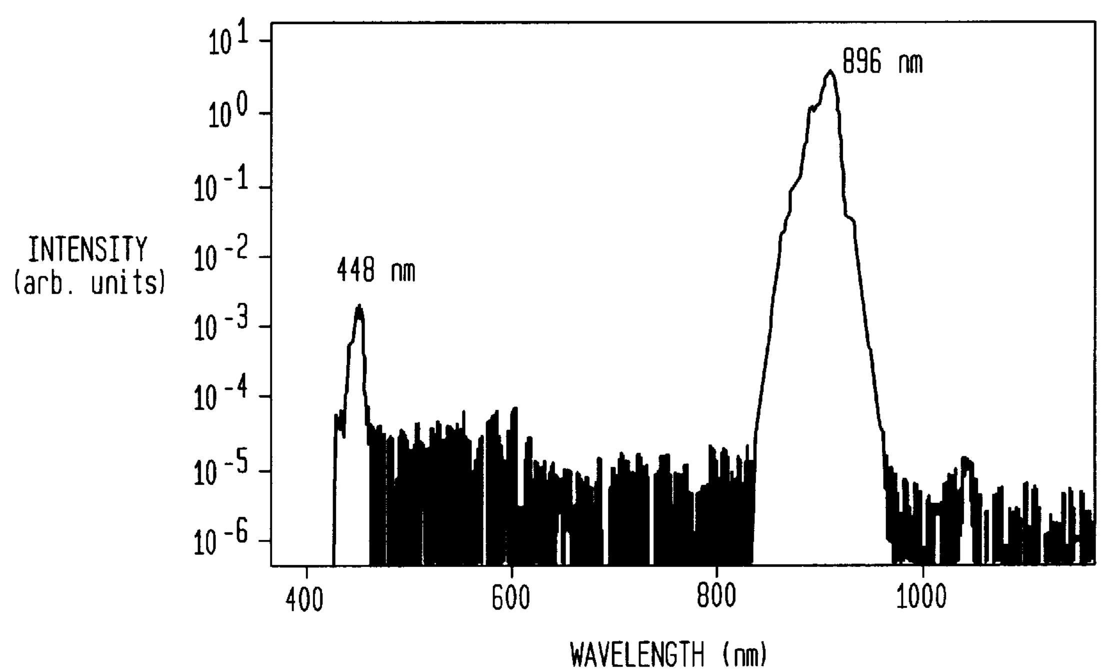
FIG. 12 is a graph showing the spectrum of the optical output from a microstructured optical fiber in accordance with a second harmonic generation experiment in accordance with another embodiment of our invention.

In this example the experiment was designed to measure fundamental transverse mode-to-fundamental transverse mode second harmonic generation in an MSF of the type described in Example I. The fiber was 10 cm long and was coupled between a pump laser and a well-known optical spectrum analyzer. The output of the pump laser, as coupled into the fiber, was an optical pulse having a wavelength of about 890 nm, duration of about 110 fs, and peak power of about 200 W. Two photons at 896 nm interacted to generate one photon at the second harmonic. As shown in FIG. 12, the output spectrum of the MSF exhibited peaks at essentially the pump wavelength (about 896 nm) and at the second harmonic (about 448 nm).

EXAMPLE V

Figure 13:
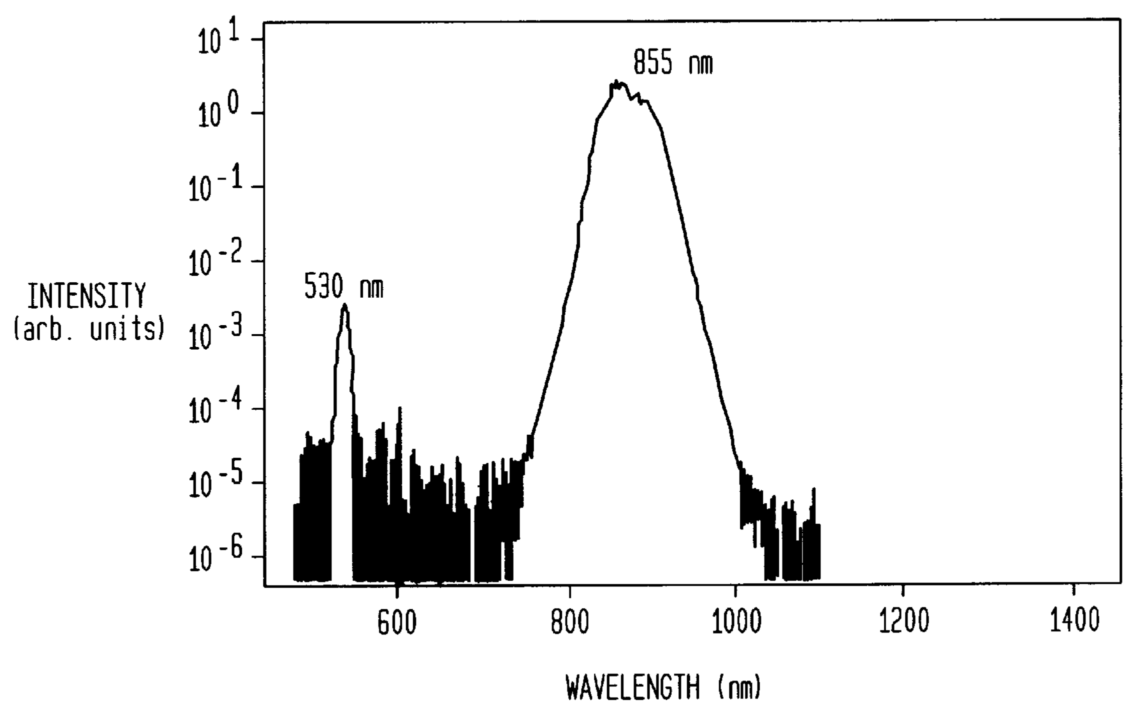
FIG. 13 is a graph showing the spectrum of the optical output from a microstructured optical fiber in accordance with a four-wave mixing experiment in accordance with yet another embodiment of our invention.

In this example the experiment was designed to measure four-wave mixing in an MSF of the type described in Example I. The fiber was 10 cm long and was coupled between a pump laser and a well-known optical spectrum analyzer. The output of the pump laser, as coupled into the fiber, was an optical pulse having a wavelength of about 855 nm, duration of about 80 fs, and peak power of about 1200 W. Two photons at about 855 nm interacted to generate one photon at about 530 nm and one at about 2427 nm. As shown in FIG. 13, the output spectrum of the MSF exhibited peaks at essentially the pump wavelength (about 855 nm) and at about 530 nm. Although we are reasonably certain that it is present, the signal at 2427 nm could not be measured with the equipment that we had available.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A microstructured optical fiber comprising a core region in which optical radiation can propagate, an inner cladding region surrounding said core region and having an effective refractive index lower than that of said core region, an outer cladding region surrounding said inner cladding region, characterized in that said inner cladding region includes a multiplicity of features positioned circumferentially in at least one relatively thin layer around said core region, said features being effective to provide index guiding of said radiation, and said core region and said inner cladding region being mutually adapted so that said fiber exhibits anomalous group velocity dispersion over a range of vis-nir wavelengths and a zero-dispersion wavelength within the same range.

2. The invention of claim 1 wherein the effective refractive index difference between said core and inner cladding regions is greater than about 5% and the effective area of said core is less than about 40 $\mu m^2$.

3. The invention of claim of 1 wherein the outer boundary of said features is less than about 10–30 $\mu$m from the outer boundary of said core region.

4. The invention of claim of 3 wherein said features are positioned circumferentially in a multiplicity of relatively thin layers.

5. The invention of claim 1 wherein said inner cladding includes capillary air holes that form said features.

6. The invention of claim 1 wherein the pattern formed by said features comprises a hexagon.

7. The invention of claim 1 wherein the pattern formed by said features comprises a triangle.

8. The invention of claim 1 wherein said core region and said cladding regions comprise silica.

9. The invention of claim 8 wherein said features comprise capillary air holes and said fiber exhibits anomalous group velocity dispersion over a wavelength range from about 700 nm to about 1270 nm.

10. The invention of claim 1 further including an optical transmitter, and optical receiver and an optical fiber transmission path that optically connects said transmitter and said receiver, and wherein said transmission path comprises a section of said microstructured fiber and said transmitter generates an optical signal at a wavelength within said range.

11. The invention of claim 1 further including a source that generates optical pulses, an optical fiber to receive said pulses, said fiber including a section of said microstructured fiber, the wavelength of said pulses being within said range and less than about 1270 nm, thereby to compress said pulses in the time domain.

12. The invention of claim 11 wherein said source comprises a semiconductor laser that generates said pulses with negative chirp.

13. The invention of claim 11 wherein the wavelength of said pulses is within said range and near to said zero-dispersion wavelength, and wherein the power of said pulses produces soliton propagation in said fiber.

14. The invention of claim 11 wherein said fiber includes a second section having normal dispersion and/or self-phase modulation and said first section has anomalous dispersion that compensates for said normal dispersion and/or self-phase modulation of said second section.

15. The invention of claim 1 further including an optical pump source, an optical fiber adapted to receive the output of said pump source, said fiber comprising at least a section of said microstructured fiber, said pump output having a wavelength $\lambda_p$ in said vis-nir range, thereby to cause said microstructured fiber to generate a broadband continuum of radiation at vis-nir wavelengths.

16. The invention of claim 15 wherein $\lambda_p$ satisfies the inequality $\lambda_o-\Delta\lambda_1<\lambda_p<\lambda_o+\Delta\lambda_2$, where $\lambda_o$ is the zero-dispersion wavelength and $\Delta\lambda_1$ and $\Delta\lambda_2$ need not be equal to one another.

17. The invention of claim 16 wherein said fiber comprises silica and 690 nm$<\lambda_p<$1270 nm.

18. The invention of claim 15 wherein $\lambda_p$ is less than the wavelength at which the material dispersion of said microstructured fiber is −50 ps/nm-km.

19. The invention of claim 15 further including means forming an optical cavity resonator, said resonator means including said optical fiber at least a portion of which is doped with an active medium, and wherein said pump output has a wavelength that is within said range and approximately equal to said zero-dispersion wavelength.

20. The invention of claim 15 the molecules of at least a segment of said fiber are poled in a non-periodic fashion so as to increase the second order nonlinear effect therein.

21. The invention of claim 1 wherein said fiber exhibits anomalous group velocity dispersion over a range of visible wavelengths and a zero-dispersion wavelength within the same range.

22. The invention of claim 1 wherein said core region has a normal material dispersion of less than about −50 ps/nm-km and the effective refractive index difference said core region and said inner cladding region is greater than about 5% so that the anomalous waveguide dispersion compensates said normal material dispersion at said zero-dispersion wavelength.

23. A microstructured optical fiber comprising a core region in which optical radiation can propagate, an inner cladding region surrounding said core region and having an effective refractive index lower than that of said core region, an outer cladding region surrounding said inner cladding region, characterized in that said inner cladding region includes a pair of essentially semicircular features positioned on opposite sides of said core region, said features being effective to provide index guiding of said radiation, and said core region and said inner cladding region being mutually adapted so that said fiber exhibits anomalous group velocity dispersion over a range of vis-nir wavelengths and a zero-dispersion wavelength within the same range.

24. The invention of claim 23 further including a pair of web members that extend from said core region to said outer cladding region and separate said features from one another.

25. The invention of claim 23 wherein said inner cladding includes air holes that form said features.

26. The invention of claim 23 wherein said fiber exhibits anomalous group velocity dispersion over a range of visible wavelengths and a zero-dispersion wavelength within the same range.

27. The invention of claim 23 wherein said core region has a normal material dispersion of less than about −50 ps/nm-km and the effective refractive index difference said core region and said inner cladding region is greater than about 5% so that the anomalous waveguide dispersion compensates said normal material dispersion at said zero-dispersion wavelength.

28. An optical communication system comprising a transmitter for generating an optical signal, a receiver adapted to receive said signal, a transmission medium for coupling said signal from said transmitter to said receiver, said medium including a section of optical waveguide, characterized in that said waveguide comprises a core region in which said signal propagates, a cladding region adjacent said core region, the effective area of said core region and the difference in effective refractive index between said core region and said cladding region being mutually adapted so that said waveguide exhibits anomalous group velocity dispersion over a range of vis-nir wavelengths and a zero-dispersion wavelength within the same range, and further characterized in that said transmitter generates a optical signal at a vis-nir wavelength within said range.

29. The invention of claim 28 wherein said waveguide comprises a first section of microstructured optical fiber including said core region in which said signal propagates, said cladding region comprising an inner cladding region surrounding said core region and having an effective refractive index lower than that of said core region, and an outer cladding region surrounding said inner cladding region, said inner cladding region including a multiplicity of features positioned circumferentially around said core region, said features being effective to provide index guiding of said signal, and said core region and said inner cladding region being mutually adapted so that said fiber exhibits anomalous group velocity dispersion within said range of vis-nir wavelengths and a zero-dispersion wavelength within the same range.

30. The invention of claim 29 wherein said inner cladding includes a multiplicity of features positioned circumferentially in at least one thin layer around said core region, the outer boundary of said features being less than about 10–30 μm from the outer boundary of said core region.

31. The invention of claim 29 wherein the effective refractive index difference between said core and inner cladding regions is greater than about 5% and the effective area of said core is less than about 40 $\mu m^2$.

32. The invention of claim 28 wherein said core region has a normal material dispersion of less than about −50 ps/nm-km and the effective refractive index difference said core region and said inner cladding region is greater than about 5% so that the anomalous waveguide dispersion compensates said normal material dispersion at said zero-dispersion wavelength.

33. An optical system comprising a laser that generates optical pulses, a single mode optical waveguide to receive said pulses, characterized in that said waveguide comprises a core region in which said pulses propagate, a cladding region adjacent said core region, the effective area of said core region and the difference in effective refractive index between said core region and said cladding region being mutually adapted so that said waveguide exhibits anomalous group velocity dispersion over a range of vis-nir wavelengths and a zero-dispersion wavelength within the same range, and further characterized in that said laser generates said pulses at a vis-nir wavelength within said range, thereby to compress said pulses.

34. The invention of claim 33 wherein said waveguide comprises a microstructured optical fiber including said core region in which said signal propagates, said cladding region comprising an inner cladding region surrounding said core region and having an effective refractive index lower than that of said core region, and an outer cladding region surrounding said inner cladding region, said inner cladding region including a multiplicity of features positioned circumferentially around said core region, said features being effective to provide index guiding of said optical pulses, and said core region and said inner cladding region being mutually adapted so that said fiber exhibits anomalous group velocity dispersion within said range of vis-nir wavelengths and a zero-dispersion wavelength within the same range.

35. The invention of claim 34 wherein said inner cladding includes a multiplicity of features positioned circumferentially in at least one thin layer around said core region, the outer boundary of said features being less than about 10–30 μm from the outer boundary of said core region.

36. The invention of claim 34 wherein the effective refractive index difference between said core and inner cladding regions is greater than about 5% and the effective area of said core is less than about 40 $\mu m^2$.

37. The invention of claim 34 wherein said source comprises a semiconductor laser that generates said pulses with negative chirp.

38. The invention of claim 34 wherein the wavelength of said pulses is within the range but near to said zero-dispersion wavelength and the power of said pulses produces soliton propagation in said fiber.

39. The invention of claim 34 wherein said waveguide includes a second section of optical fiber having normal dispersion and/or self-phase modulation and said first section has anomalous dispersion that compensates for said normal dispersion and/or self-phase modulation of said second section.

40. The invention of claim 33 wherein said core region has a normal material dispersion of less than about −50 ps/nm-km and the effective refractive index difference said core region and said inner cladding region is greater than about 5% so that the anomalous waveguide dispersion compensates said normal material dispersion at said zero-dispersion wavelength.

41. An optical generator of radiation at vis-nir wavelengths comprising an optical pump source for generating a pump signal, an optical waveguide adapted to receive said pump signal, characterized in that said waveguide comprises a core region in which said pump signal propagates, a cladding region adjacent said core region, the effective area of said core region and the difference in effective refractive index between said core region and said cladding region being mutually adapted so that said waveguide exhibits anomalous group velocity dispersion over a range of vis-nir wavelengths and a zero-dispersion wavelength within the same range, and further characterized in that said pump signal has a wavelength $\lambda_p$ in said vis-nir range, thereby to cause said waveguide to generate said radiation as a broadband continuum at vis-nir wavelengths.

42. The invention of claim 41 wherein said waveguide comprises a microstructured optical fiber including said core region in which said pump signal propagates, said cladding region comprising an inner cladding region surrounding said core region and having an effective refractive index lower than that of said core region, and an outer cladding region surrounding said inner cladding region, said inner cladding region including a multiplicity of features positioned circumferentially around said core region, said features being effective to provide index guiding of said radiation, and said core region and said inner cladding region being mutually adapted so that said fiber exhibits anomalous group velocity dispersion within said range of vis-nir wavelengths and a zero-dispersion wavelength within the same range.

43. The invention of claim 42 wherein said inner cladding includes a multiplicity of features positioned circumferentially in at least one thin layer around said core region, the outer boundary of said features being less than about 10–30 μm from the outer boundary of said core region.

44. The invention of claim 42 wherein the effective refractive index difference between said core and inner cladding regions is greater than about 5% and the effective area of said core is less than about 40 $\mu m^2$.

45. The invention of claim 42 wherein $\lambda_p$ satisfies the inequality $\lambda_o-\Delta\lambda_1<\lambda_p<\lambda_o+\Delta\lambda_2$, where $\lambda_o$ is the zero-dispersion wavelength and $\Delta\lambda_1$ and $\Delta\lambda_2$ need not be equal to one another.

46. The invention of claim 45 wherein said fiber comprises silica and 690 nm<$\lambda_p$<1270 nm.

47. The invention of claim 41 wherein $\lambda_p$ is less than the wavelength at which the material dispersion of said waveguide is −50 ps/nm-km.

48. The invention of claim 41 further including means forming an optical cavity resonator, said resonator means including said optical waveguide at least a portion of which is doped with an active medium, and wherein said pump signal has a wavelength that is within said range and approximately equal to said zero-dispersion wavelength.

49. The invention of claim 41 the molecules of at least a segment of said fiber are poled in a non-periodic fashion so as to increase the second order nonlinear effect therein.

50. An optical generator of radiation at vis-nir wavelengths comprising an optical pump source for generating a fundamental transverse mode pump signal, an optical waveguide adapted to receive said pump signal, characterized in that said waveguide comprises a core region in which said pump signal propagates, a cladding region adjacent said core region, the effective area of said core region and the difference in effective refractive index between said core region and said cladding region being mutually adapted so that said waveguide exhibits anomalous group velocity dispersion over a range of vis-nir wavelengths and a zero-dispersion wavelength within the same range, and further characterized in that said pump signal has a wavelength $\lambda_p$ in said vis-nir range, thereby to cause said waveguide to generate said radiation in a fundamental transverse mode and at a vis-nir wavelength less than said pump wavelength.

51. The invention of claim 50 wherein said waveguide comprises a microstructured optical fiber including said core region in which said pump signal propagates, said cladding region comprising an inner cladding region surrounding said core region and having an effective refractive index lower than that of said core region, and an outer cladding region surrounding said inner cladding region, said inner cladding region including a multiplicity of features positioned circumferentially around said core region, said features being effective to provide index guiding of said radiation, and said core region and said inner cladding region being mutually adapted so that said fiber exhibits anomalous group velocity dispersion within said range of vis-nir wavelengths and a zero-dispersion wavelength with the same range.

52. The invention of claim 51 wherein said inner cladding includes a multiplicity of features positioned circumferentially in at least one thin layer around said core region, the outer boundary of said features being less than about 10–30 $\mu$m from the outer boundary of said core region.

53. The invention of claim 51 wherein the effective refractive index difference between said core and inner cladding regions is greater than about 5% and the effective area of said core is less than about 40 $\mu m^2$.

54. The invention of claim 50 wherein said core region has a normal material dispersion of less than about −50 ps/nm-km and the effective refractive index difference said core region and said inner cladding region is greater than about 5% so that the anomalous waveguide dispersion compensates said normal material dispersion at said zero-dispersion wavelength.

55. The invention of claim 50 wherein $\lambda_p$ is less than the wavelength at which the material dispersion of said waveguide is −50 ps/nm-km.

* * * * *